United States Patent Office 3,099,347
Patented July 30, 1963

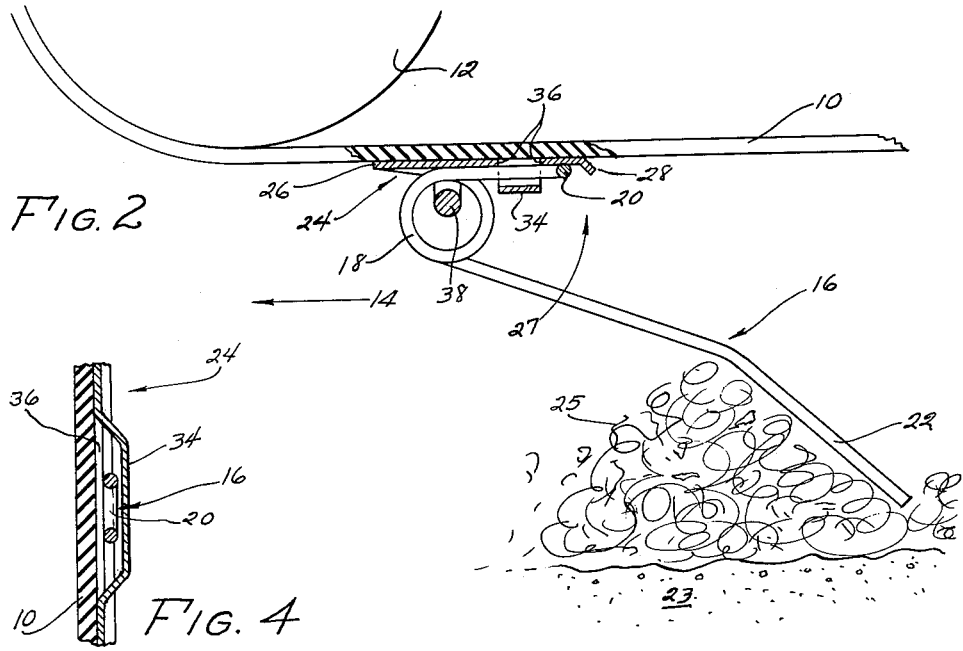
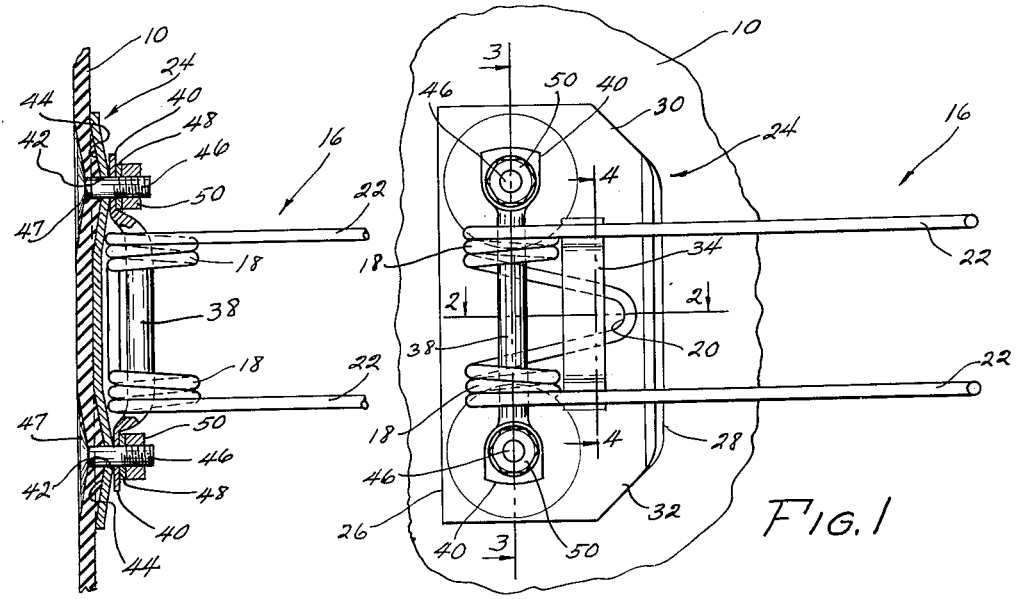

3,099,347
MEANS FOR MOUNTING SPRING FINGERS
Robert Lee Dahlquist, Rock Island, Ill., assignor to J. I. Case Company, Racine, Wis., a corporation of Wisconsin
Filed Feb. 23, 1961, Ser. No. 91,227
1 Claim. (Cl. 198—198)

This invention relates to a crop feeding means having spring feeding fingers, and especially to the means for securing the fingers to the surface of the pickup apron of a machine, such as a combine or the like.

Flexible conveyor aprons having spring fingers mounted thereon are subjected to severe treatment owing to the constant flexing of the apron by the fingers as the latter engage a crop or the ground over which the apron passes. Rocks are often encountered which severely deflect the fingers, resulting in added distortion of the apron.

Means presently available for mounting spring feeding fingers on flexible aprons or conveyor belts are unsatisfactory because they permit portions of the fingers to come directly into contact with the soft fabric-and-rubber aprons and to chafe the surfaces thereof causing localized wear, and consequently shortening the life of the apron. These mounting means are also unsatisfactory because they shift on the surface of the apron and tear or enlarge the fastening holes through which they are secured to the apron. Therefore, an object of this invention is to provide an improved clip by which to mount spring fingers on a flexible conveyor apron or the like.

Another object is to provide a spring finger clip that prevents the apron surface from being chafed by the spring finger.

Another object is to provide a spring finger clip that will not shift on the surface of the apron.

Further objects and advantages of the invention will become apparent from a consideration of the following detailed description taken in connection with the accompanying drawings, wherein an illustrative embodiment of the invention is shown. However, it is to be understood that the invention is not limited to the details disclosed but includes all such variations and modifications as fall within the spirit of the invention.

Referring to the drawing,

FIG. 1 is a fragmentary plan view of a portion of an apron having the invention assembled thereon.

FIG. 2 is a view, partly in section, taken at 2—2 of FIG. 1.

FIG. 3 is a fragmentary partial sectional view taken at 3—3 of FIG. 1, and

FIG. 4 is a fragmentary section taken at 4—4 of FIG. 1, with parts omitted.

Referring to the drawing, 10 is a conveyor apron of the type used on crop pickup devices such as those found on windrowers and harvesters and is made of rubberized fabric or canvas, and is mounted on rollers such as 12; only one being shown. Apron 10 travels in the direction indicated by arrow 14.

Spring fingers 16 of the desired number are mounted on apron 10 by means of clips to be later described.

The spring fingers 16 are shown in FIGS. 1 and 2 and are of the type shown in the patent to Irvine 2,889,607. Finger 16 is made of spring wire of suitable flexibility and comprises a pair of coils 18 having a common axis, and an intermediate loop 20 that extends longitudinally of the apron and lies in a plane parallel to the plane of the apron. Coils 18 end in yieldable crop engaging tines 22 which are positioned to extend outwardly away from the apron so as to move close to the ground 23 and to engage the crop 25, moving the latter forwardly and upwardly about roller 12 in the direction of arrow 14.

Clip body 24 is of sheet metal of the general shape shown, of a suitable thickness and of an area to provide contact over a broad surface of the apron 10, in order to avoid concentrated wear of the apron. Clip 24 has a leading edge 26 and a trailing edge 28. Trailing edge 28 is formed or bent away from the plane of apron 10 at an angle of about 45 degrees for the purpose of preventing clip 24 from cutting into the apron surface where the pressure on the tines 22 forces the trailing edge 28 into contact with the apron 10 in the direction of arrow 27. Chamfer portions 30 and 32 also reduce the tendency to chafe the apron in that they eliminate sharp corners.

Clip 24 is provided with a confining means or bail 34 to receive loop 20, and is made by slitting the clip body as at 36 of FIGS. 2 and 4, and forming or stretching the material of the clip upwardly or out of the plane of the clip body. Loop 20 is inserted into bail 34 which then embraces or confines the loop against lifting from the clip 24, thereby preventing the spring finger 16 from rotating clockwise relatively to clip 24, as viewed in FIG. 2.

A retainer 38, such as is shown in the patent to Irvine 2,889,607, provides the means to anchor finger 16 to clip 24 but permits the finger to float. Retainer 38, shown in FIGS. 1, 2, and 3, is conveniently of a cylindrical cross section, extends transversely through coils 18, protrudes beyond the coils, and has flattened ends 40, having openings therein. A pair of holes 42, is provided in clip 24 and at points spaced from coils 18, as shown in FIG. 3. The metal surrounding the holes 42 is formed into shallow dimples or cavities 44, in the present instance, in the form of conical depressions, in a direction away from the surface of apron 10, as shown in FIGS. 1 and 3. Fastening means in the form of elevator bolts 46 having shallow conical heads 47 conforming generally to cavities 44, or shaped to extend thereinto, are passed through suitable apertures in apron 10, holes 42 of clip 24, and also the openings provided in retainer 38. Washers 48 and nuts 50 complete the assembly. When nuts 50 are tightened on bolts 46, apron 10 is drawn into the dimples 44 by the conical heads 47 of bolts 46, as shown in FIG. 3, thus anchoring apron 10 and clip 24 so as to prevent relative shifting between the clip body and the apron surface.

It will be clear that loop 20 which rests wholly on the surface of clip 24, terminating at a point adjacent trailing edge 28, cannot make contact with the surface of the apron so as to chafe the latter. Wear of the apron at this point is thereby prevented.

It is also clear that drawing of apron 10 into dimples 44 by heads 47 of bolts 46 clamps the apron firmly and solidly between the dimpled surfaces of the clip and the heads, and assures that no shifting of the clip can take place to result in tearing of the apertures in the apron, and that the edge 28 of clip 24, being bent outwardly, will not cut into the apron when forced against it by pressure on tines 22.

The above being a complete description of an illustrative embodiment of the invention, what is claimed as new and desired to be secured by Letters Patent of the United States is:

A finger securing means for use on a crop feeding device of the type including a moving apron of thin flexible material comprising; the combination with said apron of a clip body in the form of a unitary substantially flat
plate disposed in face-to-face contact with said apron,
a retaining member in the form of an
elongated element spaced from said plate, ,extending
transversely of the direction of movement of said apron,
means for supporting said element in said spaced relation to said plate, a
finger element comprising a pair of substantially parallel spaced teeth and a connecting section including a central loop and a pair of
spaced coils disposed on a common axis, transverse to said teeth and loosely coiled about said elongated element, said loop portion projecting from the axis of said coils, and lying in contact with said plate within the margins thereof, a
bail element integral with and displaced from the plane of said plate within the margins thereof on the side opposite said apron, said bail element being positioned to contact said loop on the side away from said plate, means engaged with said plate and said apron, and serving to secure said plate and said elongated element on said apron, whereby said loop, under the reaction of crop material engaging said fingers, will contact said plate or said bail, and not the surface of said apron, and the trailing edge of said plate, as related to the direction of movement of said apron having an out-turned portion, whereby the relatively sharp edge resulting from fabrication of the plate is spaced out of contact with the surface of said apron whereby to avoid damage to said apron.

References Cited in the file of this patent

UNITED STATES PATENTS

| | | |
|---|---|---|
| 1,600,985 | Kittilsen | Sept. 28, 1926 |
| 1,605,867 | Stotts | Nov. 2, 1926 |
| 2,790,538 | Collins et al. | Apr. 30, 1957 |
| 2,889,607 | Irvine | June 9, 1959 |
| 2,953,830 | MacRae | Sept. 27, 1960 |

FOREIGN PATENTS

| | | |
|---|---|---|
| 1,143,795 | France | Oct. 4, 1957 |